(12) United States Patent
Sakai et al.

(10) Patent No.: US 8,462,412 B2
(45) Date of Patent: Jun. 11, 2013

(54) OPTICAL SCANNER

(75) Inventors: Atsushi Sakai, Yokohama (JP);
Tsuyoshi Hashiguchi, Yokohama (JP);
Shuichi Suzuki, Yokohama (JP); Jun Nakagawa, Yokohama (JP); Koichiro Nakamura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 12/877,420

(22) Filed: Sep. 8, 2010

(65) Prior Publication Data

US 2011/0069367 A1 Mar. 24, 2011

(30) Foreign Application Priority Data

Sep. 18, 2009 (JP) .................................. 2009-216433

(51) Int. Cl.
*G02B 26/08* (2006.01)
(52) U.S. Cl.
USPC ....................................... 359/204.1; 359/316
(58) Field of Classification Search
USPC ................... 359/204.1, 204.3, 304, 315, 316, 359/320
See application file for complete search history.

(56) References Cited

U.S. PATENT DOCUMENTS

| | | | | |
|---|---|---|---|---|
| 3,872,451 A * | 3/1975 | McNaney | ..................... | 365/117 |
| 5,071,232 A | 12/1991 | Kato et al. | | |
| 5,802,223 A | 9/1998 | Nashimoto | | |
| 5,894,363 A * | 4/1999 | Yamada et al. | ............... | 359/251 |
| 6,449,084 B1 * | 9/2002 | Guo | ............................... | 359/315 |
| 6,768,573 B1 * | 7/2004 | Nishi et al. | ..................... | 359/250 |
| 6,891,653 B2 * | 5/2005 | Liu et al. | ........................ | 359/279 |
| 7,038,835 B2 * | 5/2006 | Matsuki et al. | ............... | 359/315 |
| 7,057,787 B2 * | 6/2006 | Cicchiello et al. | ............. | 359/251 |
| 7,310,181 B2 * | 12/2007 | Matsuki et al. | ............... | 359/315 |
| 7,839,565 B2 * | 11/2010 | Okayama | ...................... | 359/315 |
| 8,238,021 B2 * | 8/2012 | Sprague et al. | ............... | 359/296 |
| 2005/0174639 A1 * | 8/2005 | Zalevsky et al. | .............. | 359/484 |
| 2009/0015904 A1 * | 1/2009 | Okayama | ...................... | 359/315 |

FOREIGN PATENT DOCUMENTS

| | | |
|---|---|---|
| JP | 3-163534 | 7/1991 |
| JP | 3144270 | 1/2001 |

OTHER PUBLICATIONS

David A. Scrymgeour et al., "Cascaded electro-optic scanning of laser light over large angles using domain microengineered ferroelectrics", Applied Physics Letters, vol. 81, No. 17, Oct. 21, 2002, 3 pages.

* cited by examiner

*Primary Examiner* — Frank Font
(74) *Attorney, Agent, or Firm* — Oblon, Spivak, McClelland, Maier & Neustadt, L.L.P.

(57) ABSTRACT

An optical scanner includes a light source, an optical splitter which splits light from the light source into a plurality of light beams, an input optical element on which the light beams split by the optical splitter are incident, a driver which generates a voltage signal, an optical deflector which comprises at least two deflector portions formed close to each other on a same substrate and individually supplied with an electric action of the driver so as to capture and deflect the incident light beams using the electric action, and an output optical element which emits the deflected light beams to an image plane, wherein the optical scanner is configured to scan the image plane with the light beams by adjusting the voltage signal of the driver.

11 Claims, 10 Drawing Sheets

FIG. 16A
FIG. 16B
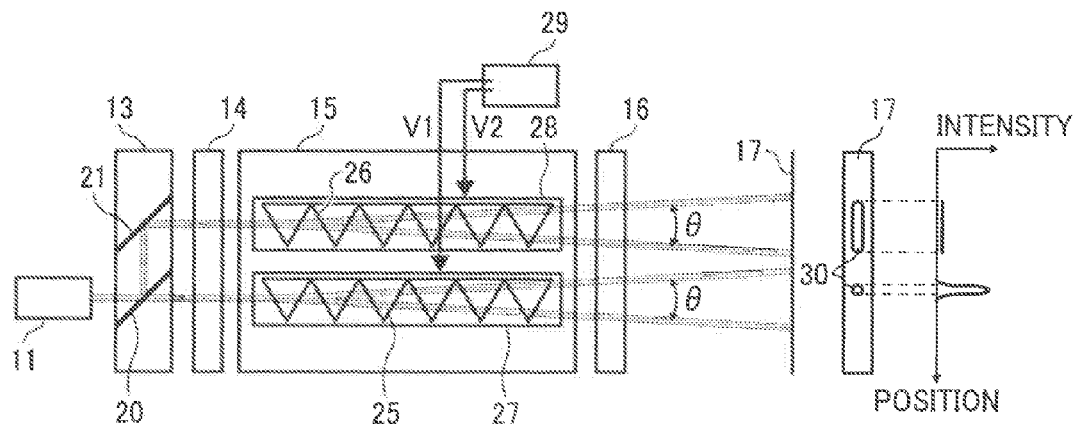
FIG. 17A
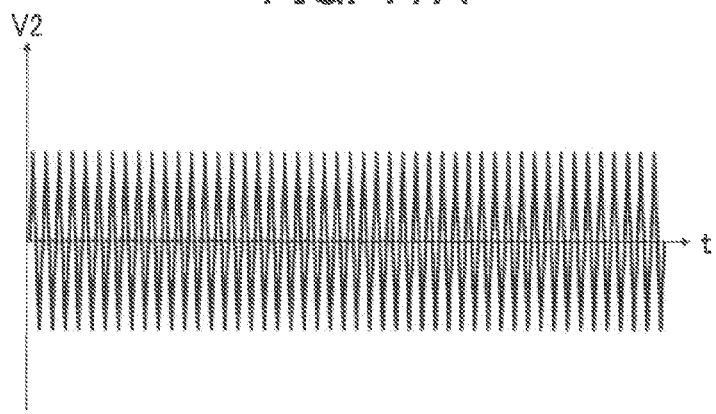
FIG. 17B
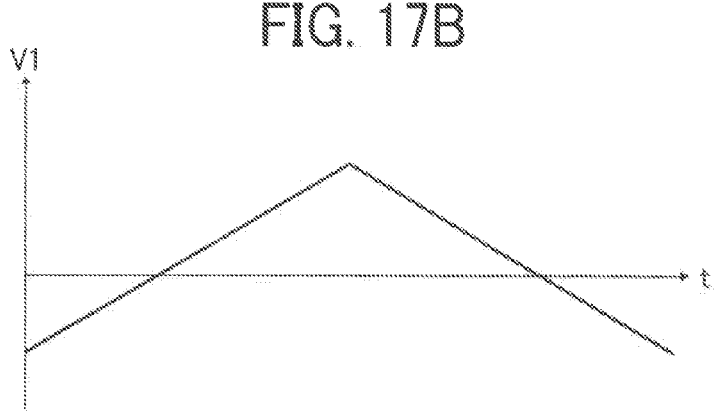

OPTICAL SCANNER

CROSS REFERENCE TO RELATED APPLICATION

The present application is based on and claims priority from Japanese Patent Application No. 2009-216433, flied on Sep. 18, 2009, the disclosure of which is hereby incorporated by reference in its entirety.

BACKGROUND OF THE INVENTION

1. Field of the Invention

The present invention relates to an optical scanner comprising an optical deflector using an electro-optic effect.

2. Description of the Prior Art

Generally, an optical scanner for use in a laser printer or a laser processing machine comprises a laser light source such as a semiconductor laser and an optical deflector deflecting laser light from the light source.

Mechanically driven mirrors such as a polygon mirror are used for the optical deflector. However, such an optical deflector has drawbacks of difficulty in downsizing and slow operation speed. Although it is possible to downsize the optical deflector by using a mirror manufactured by MEMS (Micro Electro Mechanical System) technology, there is a concern about the strength and durability of such a mirror and it cannot be driven at a high speed over MHz.

There is another type of optical deflector using an acoustic optical effect and comprising no mechanical driver. It requires an ultrasonic generator having a great output performance in order to achieve a large deflection angle, and great power outputs in order to increase the operation speed. This definitely complicates the drive system.

Utilization of optical switching technique by an electro-optic effect is one way to increase the operation speed of the optical deflector by a simple voltage driving. For example, an optical deflector using the electro-optic effect is formed by patterning polarization-inverse domains in the shape of prisms or the like on electro-optical crystals, to change a refractive index by voltage supply and deflect a light beam. The change in refractive index depends on a change in property of electrons in the crystals so that it can occur at a very high speed in order of GHz. Further, by controlling a refractive index by voltage supply, a drive circuit can be relatively simply structured. However, with a small change in the refractive index, there remains a problem that it is difficult to increase the number of resolvable spots without increasing the size of the deflector.

The number of resolvable spots of the optical scanner largely depends on the property of the optical deflector and is generally determined from a ratio of beam deflection angle and beam divergence angle. That is, to increase the number, it is necessary to increase the beam deflection angle and decrease the beam divergence angle.

The beam deflection angle is proportional to the optical path length of an index changing portion of the deflector and to a change in the refractive index of materials. The beam divergence angle is inversely proportional to a beam size. Accordingly, there are three possible ways to increase the number of resolvable spots: (1) increasing the optical path length of an index changing portion; (2) increasing the change in the refractive index of materials; and (3) increasing the beam size of light.

Aiming for elongating the optical path length of the index changing portion, a device concept of cascaded index changing portions has been proposed (Applied Physics Letters, vol. 81, No. 17, p. 3140, for example). Such a device can be made of available optical crystals such as lithium tantalite, lithium niobate. The index change of these materials is about 0.001 at most, so that the device needs to have a sufficient length in a light traveling direction to achieve a deflection angle. With a sufficiently long optical path length, even a small index change can increase the deflection angle, resulting in increasing the number of resolvable spots.

Next, with reference to FIGS. 20A, 20B, one example of increasing the optical path length of index changing portions is described. FIG. 20A shows an optical deflector 1 comprising a plurality of index changing portions 2 in the shape of inverted triangles arranged in a row and a rectangular electrode 3 surrounding the index changing portions 2. A light beam is irradiated to the optical deflector 1 from the left side in the drawing, deflected by the index changing portions and emitted from the right side of the optical deflector. The deflection angle here is θ1.

FIG. 20B shows an example of using three cascaded optical deflectors 1. By cascading them, a light beam is first deflected by a leftmost one and then deflected by the other two so that a large deflection angle θ2 about twice as large as the deflection angle θ1 can be achieved.

Further, for increasing the change in the refractive index of materials, Japanese Patent No. 3144270 discloses an optical deflector made of ferroelectric materials having a large refractive index change.

Furthermore, there is one way for increasing a beam size as shown in FIGS. 21A, 21B, for example. In FIG. 21A the beam size is set to be narrow (w1) while in FIG. 21B it is set to be wide (w2>w1).

However, there are problems with the above-described prior art techniques. The optical deflector shown in FIG. 20B configured to increase the optical path length of the index changing portions has a problem that the size of electrode supplying a drive voltage is increased three times as large as the standard size. Electro-optical materials are expected to achieve an extremely high-speed index change, using action of electrons in the crystals. Power consumed by transmitting signals at high speed greatly depends on the electrostatic capacitance of the entire circuit and an applied voltage. The electrostatic capacitance is proportional to the size of the electrode so that the larger the size of the electrode, the larger the power consumption, limiting the operation speed.

Moreover, materials with a large index change mostly exhibit extremely large permittivity. Since the permittivity is proportional to the electrostatic capacitance of the entire circuit, a large permittivity leads to increasing power consumption, limiting the operation speed. Besides, such materials are of an extremely particular kind and cannot be produced at low cost.

Further, with regard to increasing the beam size of light, the larger the beam size, the larger the size of the index changing region through which light is propagated. Accordingly, the size of a portion of the electrode changing the index, specifically, the height thereof (D1 to D2), need be increased as shown in FIG. 21B, increasing power consumption due to an increase in the electrostatic capacitance and limiting the operation speed, as in the above. Furthermore, the device has to include a long optical path length and a special optical system for modulating a parallel light beam from a semiconductor laser into one with a sufficient beam size, which increases the size of the device. It is also necessary to assemble the device at high precision since an allowable error in incident position of light with a large beam size on the optical deflector is very small.

SUMMARY OF THE INVENTION

The present invention aims to provide an optical scanner which can increase the number of resolvable spots without limiting the operation speed.

According to one aspect of the present invention, an optical scanner comprises a light source, an optical splitter which splits light from the light source into a plurality of light beams, an input optical element on which the light beams split by the optical splitter are incident, a driver which generates a voltage signal, an optical deflector which comprises at least two deflector portions formed close to each other on a same substrate and individually supplied with an electric action of the driver so as to capture and deflect the incident light beams using the electric action, and an output optical element which emits the deflected light beams to an image plane, wherein the optical scanner is configured to scan the image plane with the light beams by adjusting the voltage signal of the driver.

Preferably, the optical scanner further comprises an optical adjuster which adjusts optical paths of the light beams emitted from the output optical element.

Preferably, the optical scanner further comprises an optical shield which blocks one of two beam spots of the light beams which are most deflected by application of a maximum voltage by the driver.

Preferably, the optical scanner further comprises a transmissive-type optical switch in replace of the optical splitter, configured to transmit or block the light from the light source.

Preferably, the optical scanner further comprises a reflective-type optical switch in replace of the optical splitter, configured to reflect or stop reflecting the light from the light source.

Preferably, the optical scanner according to claim 1, further comprising an optical switch embedded in the optical deflector in replace of the optical splitter, configured to guide or stop guiding the light from the light source to the deflector portions.

Preferably, in the optical scanner the driver is configured to apply voltages at different frequencies to the respective deflector portions.

Preferably, the optical scanner further comprises a plurality of optical adjusters configured to adjust optical paths of the light beams emitted from the output optical element and arranged in association with the deflector portions, respectively, so as to compensate for the optical paths of the light beams deflected by the deflector portions each other.

Preferably, the optical scanner further comprises a plurality of mirrors configured to adjust optical paths of the light beams emitted from the output optical element and arranged in association with the deflector portions, respectively, so as to compensate for the optical paths of the light beams deflected by the deflector portions each other.

BRIEF DESCRIPTION OF THE DRAWINGS

Features, embodiments, and advantages of the present invention will become apparent from the following detailed description with reference to the accompanying drawings:

FIG. 16A schematically shows an optical scanner according to a fifth embodiment, and FIG. 16B shows beam spot positions on the image plane;

FIG. 17A shows a voltage waveform applied by a drive circuit when a voltage frequency is high and FIG. 17B show the same when the voltage frequency is low;

DETAILED DESCRIPTION OF PREFERRED EMBODIMENTS

Hereinafter, embodiments of the present invention will be described in detail with reference to the accompanying drawings.

First Embodiment

Figure 1A:
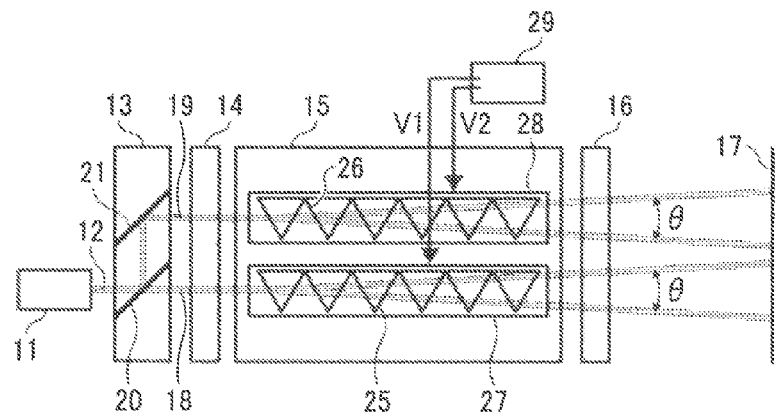
FIG. 1A schematically shows the structure of an optical scanner according to a first embodiment.
Figure 1B:
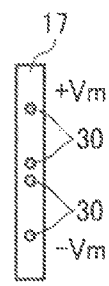
FIG. 1B shows beam spot positions on an image plane.
Figure 11A:
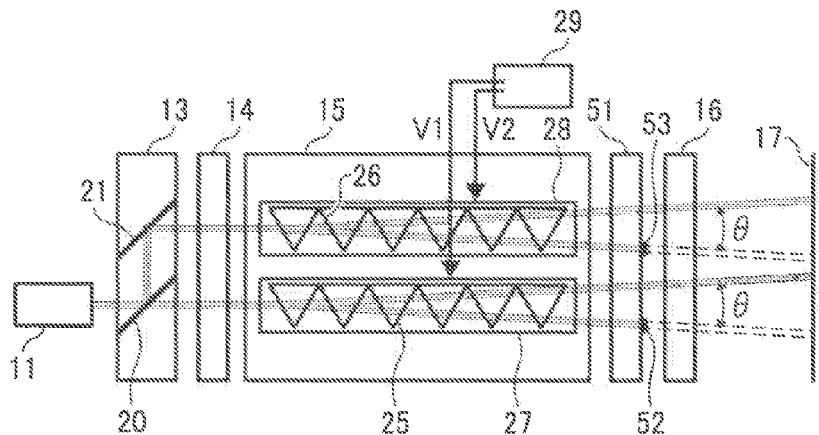
FIG. 11A schematically shows another example of the optical scanner according to the third embodiment.
Figure 11B:
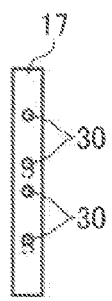
FIG. 11B shows beam spot positions on the image plane.

FIG. 1 schematically shows an optical scanner according to a fourth embodiment, and FIG. 11B shows beam spot positions on the image plane.

In FIG. 1A the optical scanner comprises a light source 11, an optical splitter 13, an input optical element 14, an optical deflector 15, an output optical element 16, and an image plane 17 arranged in a traveling direction of light. The light source 11 comprises a semiconductor laser and a collimate lens, to emit parallel light (laser beam) 12 with a beam size of about 1 mm and an output of about 10 mW. Red light with a wavelength of about 650 nm is used for the parallel light 12 in the present embodiment. However, it can be light with various wavelengths from visible light to near-infrared light.

The optical splitter 13, input optical element 14, optical deflector 15, and output optical element 16 are made of optimal materials to be adapted to the wavelength of light from the light source 11. The laser beam is polarized light whose electric field oscillates perpendicularly to the drawing.

The optical splitter 13 is configured to split a light beam from the light source 11 into plural lights (here, two light beams 18, 19) and comprises a half mirror 20 with a reflection rate of 50% and a mirror 21 with a reflective rate of 100%. The half mirror 20 and mirror 21 split the optical power into two light beams 18, 19. Needless to say, the light beam can be split into three or more light beams by use of a reflective mirror which can optimally divide the optical power.

Figure 2:
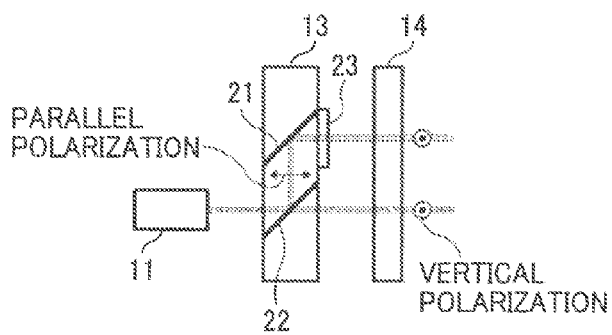
FIG. 2 shows another example of an optical splitter.

As shown in FIG. 2, the optical splitter 13 can be comprised of a polarized beam splitter 22 and a wave plate 23. In this case polarized light inclined at 45 degrees relative to the drawing is incident on the optical splitter 13. The polarized light splitter 22 splits the incident light into polarized light P (parallel to the drawing) and polarized light S (vertical to the drawing). The polarized light S travels ahead while the polarized light P is reflected to the half mirror 21. The reflected polarized light P is then converted into polarized light S by the wave plate 23, forming a light beam of two aligned polarized lights.

Figure 3:
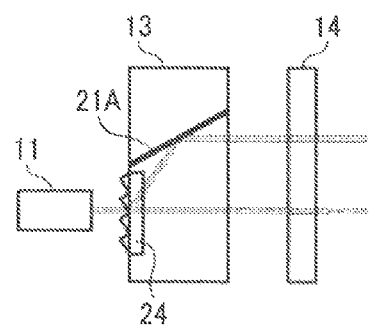
FIG. 3 shows still another example of the optical splitter.

As shown in FIG. 3, the optical splitter 13 can be one having a diffracting grating 24 to split light in conjunction with the order of diffraction. The laser light from the light source 11 is split by the diffracting grating 24 of the optical splitter 13 into 0-th order diffracted light and first-order diffracted light. The 0-th order diffracted light travels straight while the first-order diffracted light travels obliquely upwards and is reflected by a half-mirror 21A to travel in parallel to the 0-th order diffracted light.

The two split light beams are emitted from the optical deflector 15 through the input and output optical elements 14, 16. The input optical element 14 is an element to adjust the beam shape of light and formed of a cylindrical lens for shaping light in a vertical direction relative to the drawing. Alternatively, it can be formed of a lens group for shaping light in a parallel direction relative to the drawing.

The optical deflector 15 includes index changing regions 25, 26 as deflector portions as shown in FIG. 1A. The index changing regions 25, 26 are each formed of a series of triangular prisms. With a voltage applied, polarity of the index change inside the prisms changes to be reverse to that outside the prisms. For instance, when the index change inside the prisms is $-\Delta n$, that outside the prisms is $+\Delta n$. Note that the index changing region can be such horn-shaped prisms that the heights of the prisms increase as they are disposed closer to the output side.

Moreover, electrodes 27, 28 are provided to surround the index changing regions 25, 26 and they are individually formed to be insulated from each other.

Figure 4:
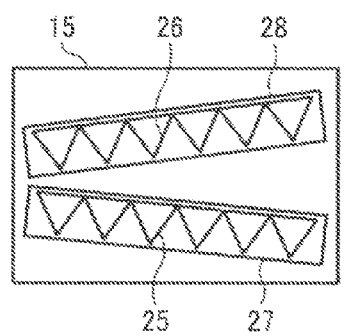
FIG. 4 shows another example of an optical deflector.

In the present embodiment the two index changing regions are arranged in parallel in FIG. 1A by way of example. However, three or more index changing regions can be arranged in parallel. Also, the index changing regions 25, 26 can be obliquely arranged so that they are separated from each other in a traveling direction of light as shown in FIG. 4 in addition to the parallel arrangement in FIG. 1A.

The index changing regions 25, 26 are close to each other and the two split light beams are incident on the regions and propagate therethrough respectively, as shown in FIG. 1A. Supplied with a voltage by a drive circuit 29 as a driver, the incident light beams in the index changing regions 25, 26 are deflected.

Figure 5A:
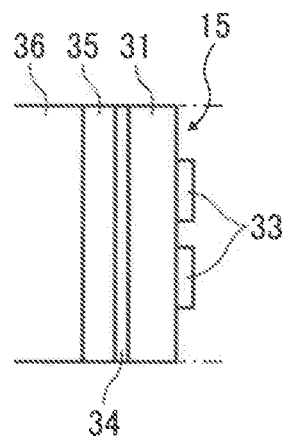
FIG. 5A is a side view of the optical deflector in detail.
Figure 5B:
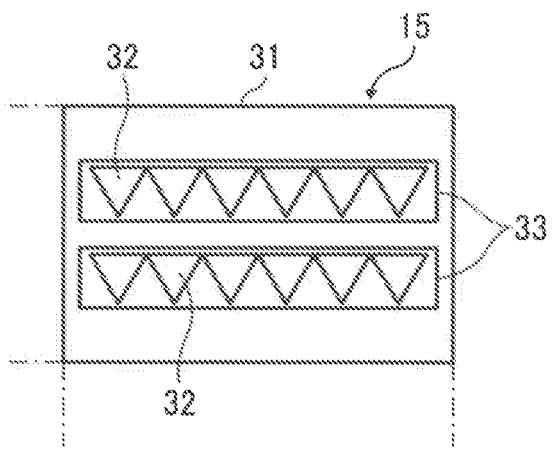
FIG. 5B and FIG. 5C are a front view and a bottom view thereof, respectively.
Figure 5C:
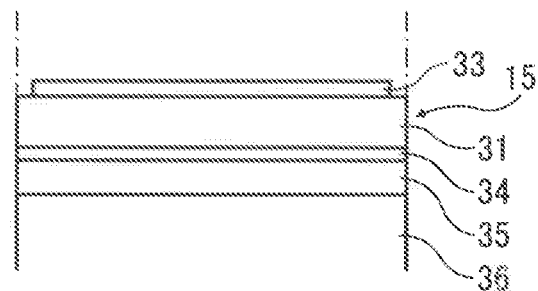

With reference to FIGS. 5A to 5C, the structure of the optical deflector 15 is described in detail. FIGS. 5A to 5C are a side view, a front view, and a bottom view thereof, respectively.

In general, the optical deflector 15 is made of electro-optic materials or electro-magnetic crystals. According to the present embodiment, the deflector body is made of a lithium niobate substrate 31 on which a resist pattern of triangles in height of 3 mm and width of 1 mm is formed by photolithography. By applying a high voltage from both sides of the substrate 31, a portion without the resist pattern is directly applied with the voltage and polarization inversion occurs thereon. As a result, polarization inverted portions 32 in triangle shape in association with the resist pattern are formed. Thus, the index changing regions 25, 26 (FIG. 1A) with opposite polarities from each other are formed.

Here, two same or similar structures are formed to be close to each other by photolithography and to have inverse polarities by polarization inversion at the same time as shown in FIG. 5B. It is possible to deposit a plurality of patterns at once closely to each other on the substrate 31 and create a polarity inverted substrate. In the present embodiment two vertical polarization inverted regions in which the plurality of polarization inverted portions 32 are connected in series are vertically formed. The number of the regions is arbitrary and it can be as many as the number of light beams. Alternatively, by setting a mask pattern in advance, an arbitrary pattern can be formed on the same region as easily as a single pattern is formed.

Next, an electrode 33 is formed in a size sufficient to cover the polarization inverted region on one side of the substrate 31 and another electrode 34 is formed to cover the other side of the substrate 31. The substrate 31 is placed between the electrodes 33, 34. Generally, thickness of the substrate 31 is from about 300 micron to 500 micron. However, it is preferable to be thinner so as to generate index change by low voltage supply. In the present embodiment the thickness of the substrate 31 is thin but the mechanical strength thereof is secured by placing the substrate 31 between the electrodes 33, 34.

The substrate 31 having the polarization inverted regions is attached to a support board 36 via an adhesive layer 35. That is, one side of the substrate 31 having the electrode 34 is attached to the support board 36 by an adhesive, and the other side thereof without the electrode 34 is thinned by polishing. A much thinner structure can be driven by a lower voltage, however, that requires a high-precision machining. Therefore, in the present embodiment the thickness of the substrate 31 is about 10 micron to 20 micron.

It is preferable that the support board 36 is made of the same lithium niobate substrate as the substrate 31 to have the same thermal expansion coefficient. However, it can be made of silicon, quartz, or a glass plate. The thickness of the support board 36 is about 500 micron.

As shown in FIG. 1A, the electrodes 27, 28 are formed to cover the index changing regions 25, 26, respectively so that the index changing regions 25, 26 are independently disposed so as not to establish electric continuity. The electrodes 27, 28 are wired to be individually driven by the drive circuit 29 as a voltage generator. Applying a positive or negative voltage to the electrodes 27, 28 by the drive circuit 29 causes the Pockels effect of the lithium niobate to deflect the light beam. FIG. 1A shows the deflection angle θ of the light beam supplied with the maximal voltage. The light beam is continuously deflected between the deflection angle θ depending on the magnitude of voltage.

Beam spots 30 can accurately reach the image plane 17 which is properly positioned as in FIG. 1A. The beam spots are vertically movable by separately adjusting a voltage V1 applied to the electrode 27 and a voltage V2 applied to the electrode 28, as shown in FIG. 6A.

Figure 6A:
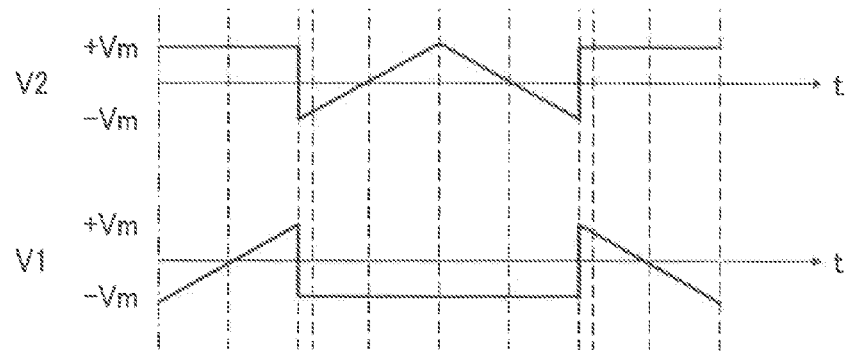
FIG. 6A shows an example of drive waveform of a voltage of a drive circuit.
Figure 6B:
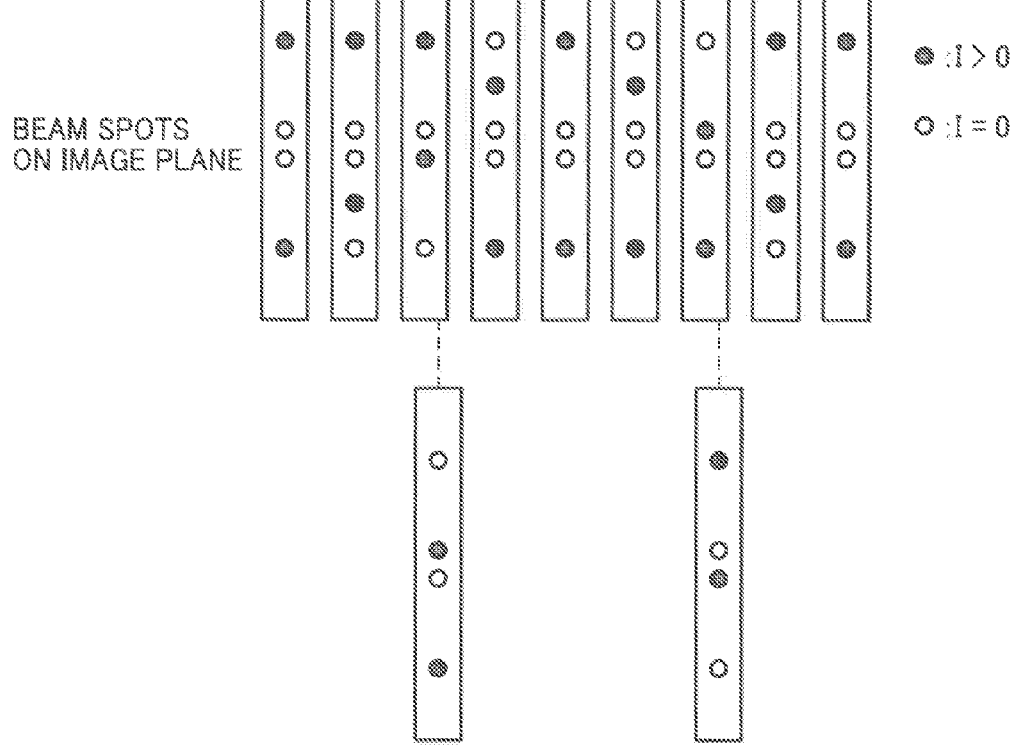
FIG. 6B shows a temporal change in the beam spot positions according to the drive waveform.

Referring to FIGS. 6A, 6B, when V1=−Vm and V2=+Vm, the interval between beam spots is largest. Note that in FIG. 6B black spots are ones with optical intensity I over zero (bright light) while white points are ones with optical intensity being zero (no light).

Then, the voltage V1 is changed from −Vm to +Vm while the voltage V2 is maintained at +Vm, moving the beam spots as shown in FIG. 6B. At the voltage V1 reaching +Vm, the voltages V1, V2 are adjusted so that V2=−Vm, V1=−Vm, to switch the beams to deflect. Then, the beam spots are changed as shown in the drawing while the voltage V2 is changed from −Vm to +Vm and the voltage V1 is maintained at −Vm.

Moreover, reversely applying the voltages V1, V2 makes it possible to deflect light in the opposite direction.

According to the present embodiment as above, the polarization inverted region comprising the index changing regions 25 and the polarization inverted region comprising the index changing regions 26 are configured to be in the same size. The voltage V1 applied to the electrode 27 and the voltage V2 applied to the electrode 28 are independently controlled. Accordingly, it is made possible to double the deflection angle of light for scanning, which can achieve an optical deflector having a doubled number of resolvable spots. Further, the increase in the number of resolvable spots does not cause an electric limitation since the area of the electrode applied with the voltage is equal to that of the electrode driving a single optical deflector.

Second Embodiment

Figure 7A:
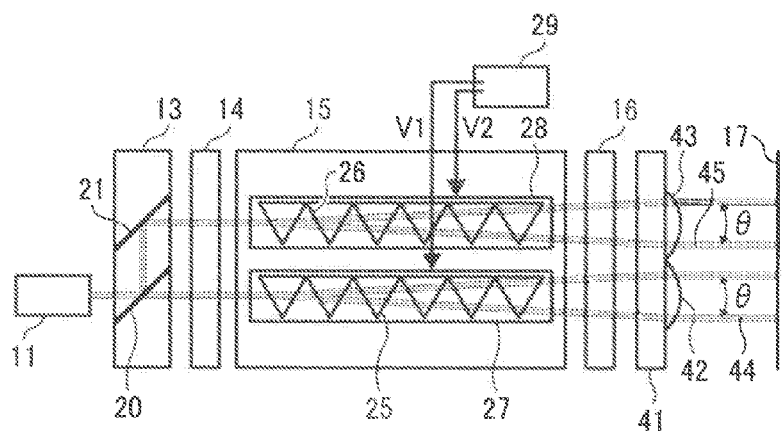
FIG. 7A schematically shows an optical scanner according to a second embodiment.
Figure 7B:
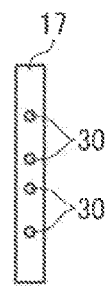
FIG. 7B shows beam spot positions on the image plane.
Figure 8A:
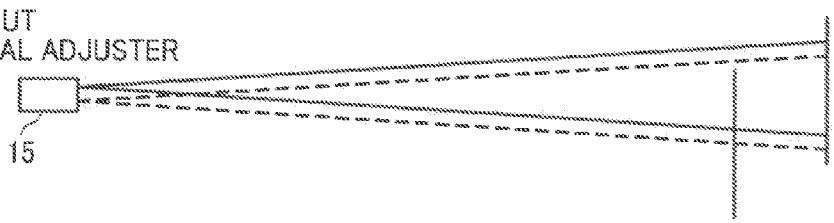
FIG. 8A shows a trajectory of a light beam from the optical deflector without an optical adjuster and FIG. 8B shows the same with the optical adjuster.
Figure 8B:

Now, a second embodiment of the present invention is described with reference to FIGS. 7A, 7B and FIGS. 8A, 8B. FIG. 7A schematically shows the structure of an optical scanner according to the second embodiment, and FIG. 7B shows beam spots on the image plane. FIGS. 8A, 8B show trajectories of light beams from the optical deflector 15. In the drawings a light beam deflected by the index changing regions 26 is indicated by a solid line while that deflected by the index changing regions 25 is indicated by a dashed line.

In the second embodiment the optical scanner additionally comprises an optical adjuster 41 between the output optical element 16 and the image plane 17. The optical adjuster 41 is formed of lenses 42, 43 adjacently disposed to each other. The other structure thereof is the same as that of the first embodiment.

With a sufficient distance to the image plane, since the deflected light beams from the optical deflector 15 are inclined, they may be crossed over each other, which cancels the increase in the deflection angle.

In view of solving the above problem, the lenses 42, 43 of the optical adjuster 41 are provided to change the optical paths of the light beams from the optical deflector 15 to travel to the image plane without the crossing-over.

The second embodiment shows an example of the optical adjuster 41 comprising the two lenses, however, it can be comprised of a lens group. Moreover, in FIG. 7A the optical adjuster 41 is configured to adjust the light beams to be parallel beams 44, 45. At a fixed distance to the image plane 17, it is possible to continuously deflect light beams by adjusting an angle between the light beam deflected by the index changing region 25 and the light beam deflected by the index changing region 26. Further, the optical adjuster 41 can be provided between the optical deflector 15 and the output optical element 16 instead of between the output optical element 16 and the image plane 17.

Third embodiment

Figure 9A:
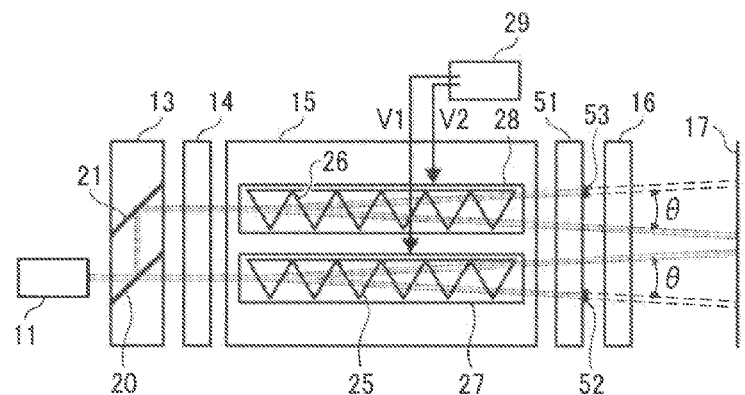
FIG. 9A schematically shows an optical scanner according to a third embodiment.
Figure 9B:
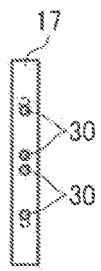
FIG. 9B shows beam spot positions on the image plane.

FIG. 9A schematically shows the structure of an optical scanner according to a third embodiment, and FIG. 9B shows beam spots on the image plane.

In the third embodiment the optical scanner additionally comprises an optical shield 51 between the optical deflector 15 and the output optical element 16. The optical shield 51 is configured to block a light beam among the light beams which is applied with a maximal voltage. The optical shield 51 includes optical absorption films 52, 53 as shield portions to block an incident light beam by absorbing optical power thereof.

Such optical absorption films 52, 53 can be made of photodiode to convert light into an electric signal. By constantly checking irradiation of the light beam using the electric signal, the feedback control is enabled.

The shield portions can be of an optical reflective structure to reflect the light beams in such a direction as not to irradiate the image plane 17. It can also attain the same effects as those of the absorption films.

Next, a manufacture method of the optical shield 51 is described. First, absorbing materials are filmed on a glass plate by sputtering. Then, the film is removed by photolithography and etching except for a portion to become a shield portion. The size of the shield portion is substantially the same as the beam size (width) of light. Alternatively, the optical shield 51 can be formed of photodiodes precisely aligned on the glass plate.

With provision of the optical shield 51, the optical scanner can independently deflect two light beams without generating extraneous beam spots of stray light.

Figure 10A:
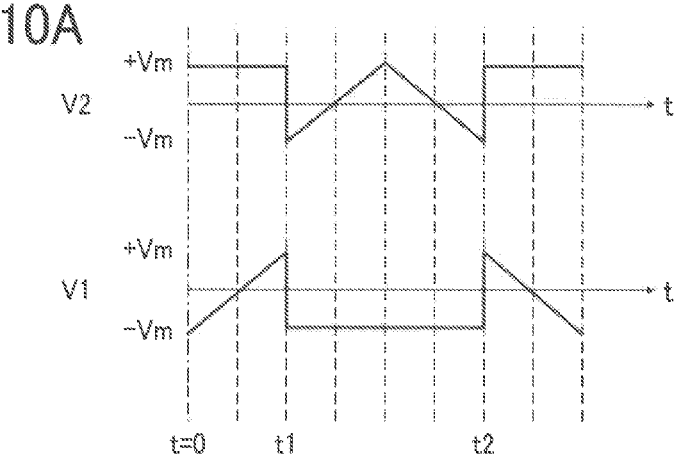
FIG. 10A shows an example of drive waveform of a voltage of a drive circuit.
Figure 10B:
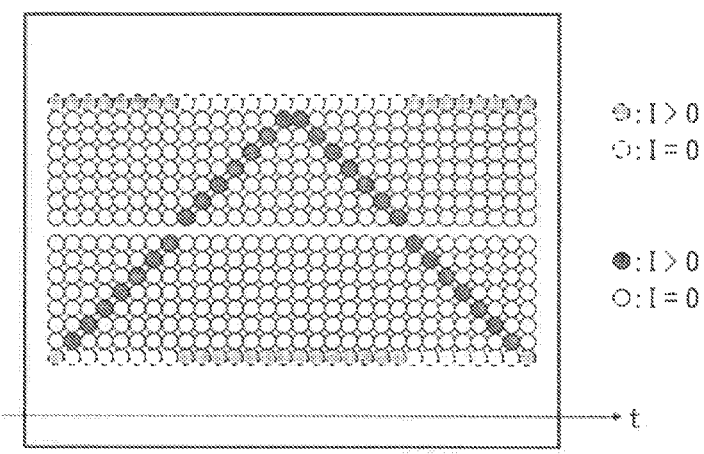
FIG. 10B shows a temporal change in the beam spot positions according to the drive waveform.

FIG. 10A shows an example of drive waveforms of the voltages V1, V2 of the drive circuit 29 and FIG. 10B shows a change in beam spot positions over time. The optical shield is configured to block light beams when V1=−Vm, V2=+Vm. In FIG. 10B, when at t=0, the voltage V1 being −Vm and the voltage V2 being +Vm are applied, the light beams hit the optical absorption films 52, 53 so that there are no beam spots on the image plane 17. In FIG. 10B beam spots not appearing as an image are indicated by broken lines and grey ones have intensity I>0 and white ones have intensity I=0. Beam spots appearing as an image are indicated by solid lines, black beam spots have intensity I>0 and white ones have intensity I=0.

At t>0, the voltage V1 is changed from −Vm to +Vm and the voltage V2 is maintained at +Vm. Only the position of a single beam spot (black) is moved on the image plane 17 as in FIG. 10B.

At t=t1, with the voltage V1 being −Vm constantly applied, the light beams hit the shield portions so that beam spots disappear. At the same time, the voltage V2 is changed from −Vm to +Vm, thereby moving the position of the only one spot. Further, by changing the voltage V2 from +Vm to −Vm, the position of the beam spot is moved in the opposite direction. At t=t2 a fixed voltage V2 being +Vm is applied and the voltage V1 is changed from +Vm to −Vm. Thus, scanning with the light beam as in FIG. 10B is realized.

By applying a series of voltages as above, only a single beam spot can scan the image plane. Such an operation, which is not feasible by a mirror element such as a polygon mirror, is easily feasible using the optical deflector 15 which can scan a light beam at an arbitrary position by voltage supply.

The position of the shield portions is arbitrarily decided. For example, the absorption films 52, 53 can be arranged to block the light beams deflected in the same direction as shown in FIG. 11A. Moreover, In FIGS. 9A, 9B and FIGS. 11A, 11B a light beam is split into two beams by way of example, however, the number of split light beams can be three or more. Only one of the three or more light beams can be moved by applying the voltages as above.

At present a semiconductor laser with output performance of 100 mW is available. Therefore, a reduction in light amount of the split light beams will not be a problem. Rather, the optical scanner can perform more stable scanning than one with a plurality of semiconductor lasers with low output performance.

The optical scanner comprising the optical shield 51 according to the present embodiment can achieve a large deflection angle and a large number of resolvable spots without an increase in electrostatic capacitance.

Figure 12:
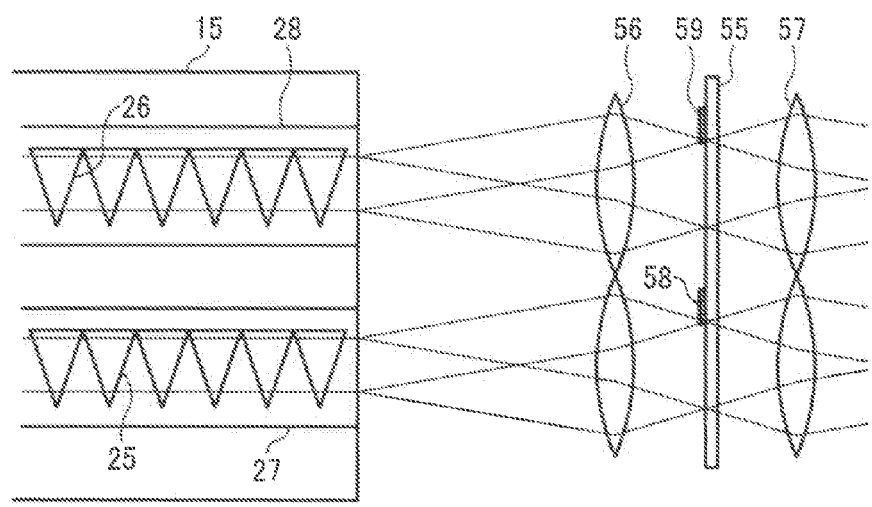
FIG. 12 shows an example in which an optical shield is placed between two relay lens arrays.

FIG. 12 shows another example of an optical shield provided between relay lens arrays 56, 57. An optical shield 55 is configured to deal with a situation when the width of the index changing regions 25, 26 of the optical deflector 15 and the beam size of the deflected light is substantially the same. In such a situation the optical shield 55 cannot sufficiently function unless it is disposed far from the optical deflector 15.

The relay lens array 56 converges the light from the optical deflector 15 to separate beams spots and shield portions 58, 59 of the optical shield 55 block a part of the separated beam spots. This makes it possible to prevent generation of extraneous beam spots. The thus-configured optical scanner can perform optical scanning not to generate extraneous beam spots without enlarging the size thereof even when there is almost no difference between the beam size and the width of the index changing portions of the optical deflector.

Fourth Embodiment

A fourth embodiment of the present invention is described with reference to FIG. 13 to FIG. 15. The present embodiment concerns an example in which an optical switch is provided on an input side in order to eliminate extraneous beam spots.

Figure 13:
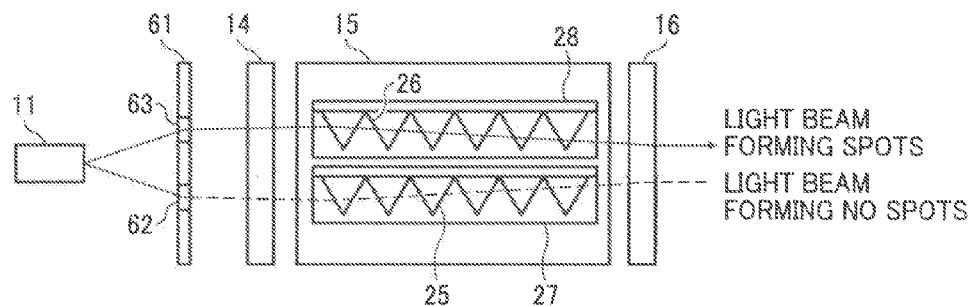
FIG. 13 schematically shows the structure of an optical scanner comprising a transmissive-type optical switch according to a fourth embodiment.

Referring to FIG. 13, the optical scanner includes a transmissive-type optical switch 61 between the light source 11 and the input optical element 14. The transmissive-type optical switch 61 includes transmission changing regions 62, 63. Light from the light source 11 is irradiated to one face of the transmissive-type optical switch 61. It can be configured to switch transmission or non-transmission of light through the transmission changing regions 62, 63 by changing the transmission rate thereof by an outside signal. The light having transmitted through the regions 62, 63 is irradiated to the input optical element 14.

In FIG. 13 the transmission changing region 62 is switched off while that 63 is switched on. In this case a light beam is incident only on the index changing region 62 to form beam spots on the image plane. Accordingly, when a deflected light beam is incident on the index changing region 25, a light beam incident on the index changing region 26 is cut off. Likewise, when a deflected light beam is incident on the index changing region 26, a light beam incident on the index changing region 25 is cut off. This can prevent generation of stray light due to extraneous light beams.

By way of example, the transmissive-type optical switch can be a liquid crystal spatial modulator which is formed of a liquid crystal deflector element placed between two deflection plates. It is configured to control turning-on and -off of light by applying a voltage to the liquid crystal deflector element. The liquid crystal display technology is applied to the modulator. Supposed that the switching speed of the spatial modulator is 500 μs and the scanning spots of the optical deflector is 50, the scan speed from one point to another point will be 10 μs so that electric timing control over switching the modulator can be done without difficulty.

Figure 14:
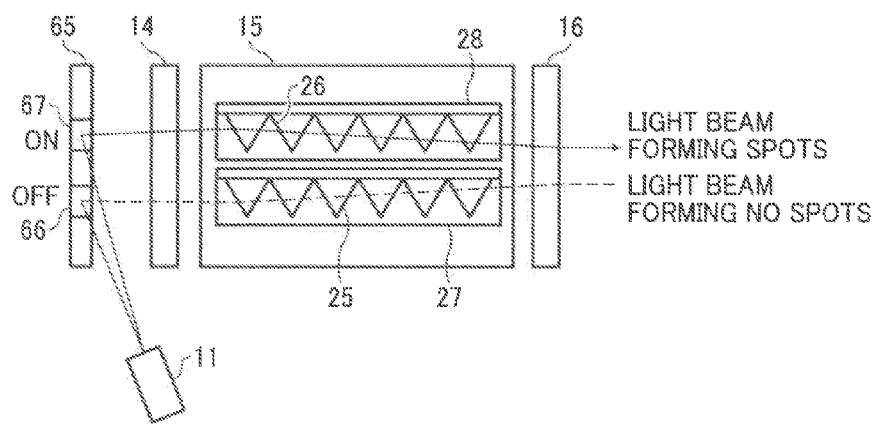
FIG. 14 schematically shows the structure of an optical scanner comprising a reflective-type optical switch according to the fourth embodiment.

FIG. 14 shows another example in which a reflective-type optical switch 65 is provided between the light source 11 and the input optical element 14. The reflective-type optical switch 65 includes reflectance controlling portions 66, 67 which are configured to guide (ON) or not to guide (OFF) a light beam from the light source 11 to the input optical element 14 by changing the reflectance thereof.

The reflective-type optical switch 65 can be an optical switch made of a MEMS mirror using a commonly used technique for a display, for example. The switching speed of the MEMS mirror is about 100 μs. In combination with the optical deflector, optical scanning at the switching speed of about 10 μs is realized.

Figure 15:
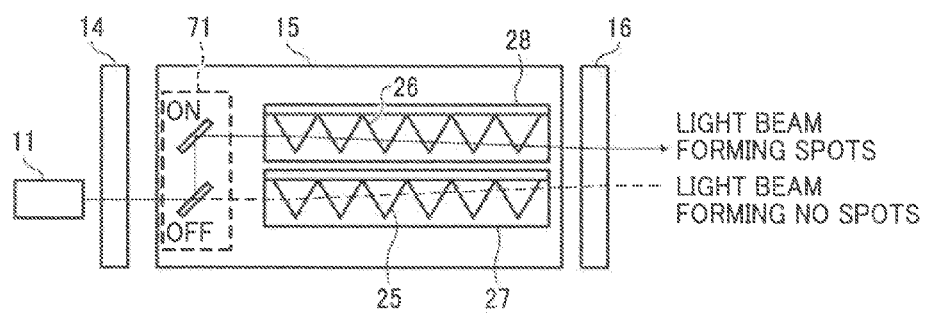
FIG. 15 schematically shows the structure of an optical scanner comprising an optical deflector with an optical switch according to the fourth embodiment.

FIG. 15 shows another example where the optical deflector 15 is integrated with an embedded optical switch 71. The embedded optical switch 71 can be manufactured by forming patterns by polarization inversion as the index changing regions 25, 26. It is relatively easy to integrally form the embedded optical switch 71 and the optical deflector 15 by forming an arbitrary pattern using a mask pattern by lithography, as described above.

The embedded optical switch 71 can be made of a total reflecting prism or multi-layer film by forming patterns by polarization inversion.

A total reflecting prism is a prism angulated so as to generate total reflection due to a difference in refractive index. By applying a voltage, a change in the refractive index of the prism causes total reflection to change a traveling direction of light. When the voltage supply stops, light is not reflected by the prism but transmits therethrough. This phenomenon is used to realize an optical switch. The switching can be made by multiple portions having a change in refractive index such as a multi-layer film. Due to a singularity of a wavelength of a laser beam, the multi-layer film structure can achieve a high reflectance. The multi-layer film functions as an optical switch to reflect light when applied with a voltage and to have light transmit therethrough when the voltage supply is stopped.

Fifth Embodiment

FIG. 16A schematically shows the structure of an optical scanner according to a fifth embodiment and FIG. 16B shows positions of beam spots on the image plane.

According to the present embodiment, the electrodes 27, 28 are independently applied with the voltages V1, V2 by the drive circuit 29, respectively and applied frequencies thereof are greatly different from each other. The electrodes 27, 28 are made of such materials and in such a size as to stably operate at a high frequency.

Due to a large difference in the applied frequencies of the voltages V1, V2 as shown in FIGS. 17A, 17B, light beams in the same light amount having transmitted through the index changing regions 25, 26 do not form beam spots with the same intensity on the image plane as shown in FIG. 16B. Applied with the voltage V1 with a low frequency, detected intensity of the light beam from the index changing region 25 is relatively high. But, applied with the voltage V2 with a high frequency, detected intensity of the light beam from the index changing regions 26 is low since it is uniformed in the entire width of deflected light. Amount of light is detected based on an integration value of the amount at a predetermined time interval so that the amount of scanning light at a high frequency is averaged. That is, when a region with 50 resolvable spots is scanned with light beams applied with two voltage frequencies having a difference of 50 times or more, a detected light amount of the light beam with a higher frequency is about 1/50 of that with a lower frequency on the image plane. In this case, a detector such as a photodiode needs to have a dynamic range for lower frequencies. By applying two voltages with low and high frequencies, a single beam scanning is feasible. Alternatively, the light amount can be detected by adjusting the offset of a detector or inserting a filter right before an optical exit to reduce the optical intensity. This makes it possible to exclude stray light due to extraneous light beams. Further, it is easy to change the switching speed of the electro-optic optical deflector by applying a voltage so that optical scanning in accordance with the detection timing is feasible.

Sixth Embodiment

Figure 18A:
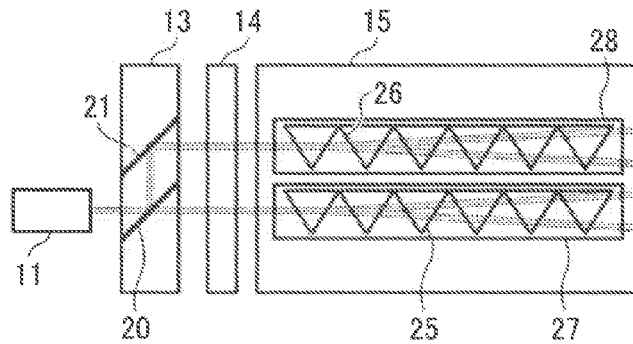
FIG. 18A schematically shows an optical scanner according to a sixth embodiment.
Figure 18B:
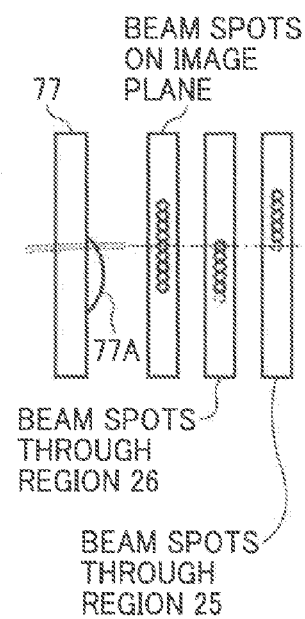
FIG. 18B shows beam spot positions on the image plane.
Figure 19A:
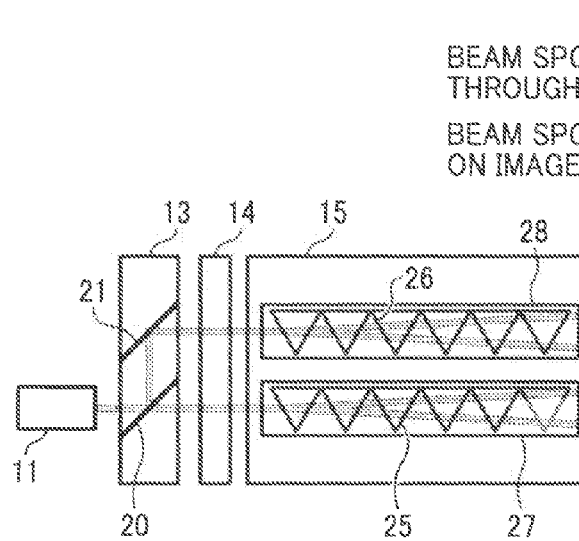
FIG. 19A schematically shows an optical scanner according to the sixth embodiment.
Figure 19B:
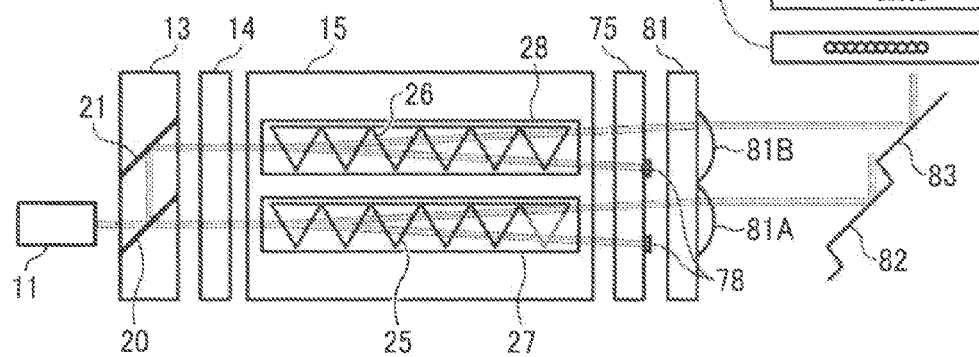
FIG. 19B shows beam spot positions on the image plane.
Figure 20A:
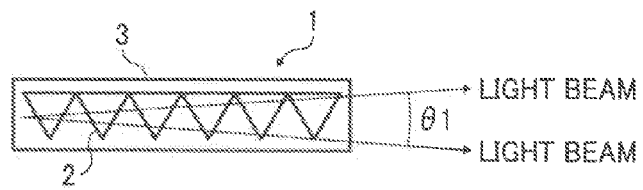
FIG. 20A shows the shape of a conventional optical deflector and FIG. 20B shows an example of three optical deflector cascaded.
Figure 20B:
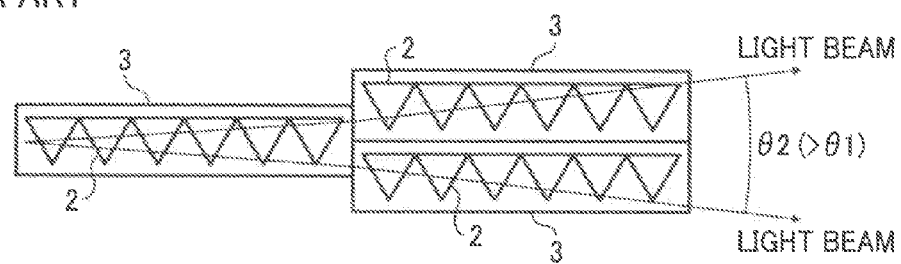
Figure 21A:
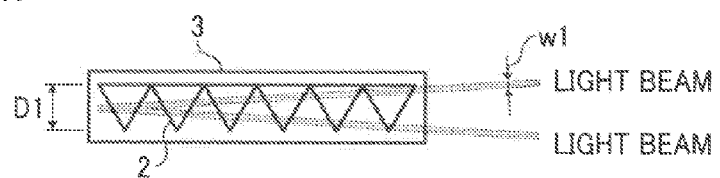
FIG. 21A shows an example of the optical deflector when a beam size is set to be narrow and FIG. 21B the same when the beam size is set to be wide, for the purpose of showing how the size of the optical deflector is affected by a beam size.
Figure 21B:
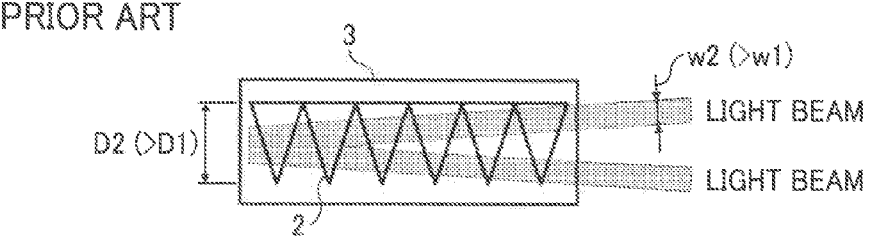

A sixth embodiment of the present invention is described with reference to FIGS. 18A, 18B and 19A, 19B. FIG. 18A schematically shows the structure of an optical scanner according to a sixth embodiment and FIG. 18B shows positions of beam spots on the image plane. The optical adjuster according to the second embodiment enables the two deflected light beams to separately form beam spots on a far image plane. However, there is a problem that a space occurs between the respective beam spots of the two light beams on the image plane in association with the maximum deflection angles of the two light beams due to a space between the index changing regions 25, 26. It is possible to continuously form beam spots if the image plane is placed with a proper distance, however, for projecting light in a different distance, it is difficult to continuously form beam spots.

In view of solving the above problem, the optical scanner is configured to further comprise a plurality of optical adjusters to combine the light beams and realize continuous optical scanning.

In FIG. 18A optical adjusters 76, 77 are arranged in series behind the optical shield 75 and include lenses 76A, 77A, respectively. The light beams having passed through the index changing regions 25, 26 are adjusted to be substantially parallel by the optical adjusters 76, 77, respectively. Because the optical shield 75 blocks a part of beam spots to allow only one spot to move on the image plane, there will be a space between beam spots formed by the parallel light beams. In order to prevent occurrence of the space, the optical adjusters are arranged with an appropriate interval. That is, the optical adjuster 77 is placed in such a position that the deflected light beam from the index changing region 25 overlaps with the light beam from the index changing region 26 and blocked by shield portions 78 of the optical shield 75 to become parallel light. This enables forming of continuous beam spots on the image plane.

FIG. 19 shows another example in which two optical adjusters, one including lenses and the other including mirrors are provided. An optical adjuster 81 including lenses 81A, 81B and mirrors 82, 83 behind the optical adjuster 81 are arranged in the drawing.

The parallel light beam from the lenses 81A, 81B are reflected by the mirrors 82, 83 at different positions to form beam spots on the image plane to compensate for the ones blocked by the optical shield 75. This makes it possible to continuously form beam spots on the image plane for scanning.

As described above, the optical scanner according to any of the above embodiments can increase the number of resolvable spots without a reduction in the operation speed.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. An optical scanner comprising:
a light source;
an optical splitter which splits light from the light source into a plurality of light beams;
an input optical element on which the light beams split by the optical splitter are incident;
a driver which generates a voltage signal;
an optical deflector including at least two deflector portions formed adjacent to each other on a same substrate and individually supplied with an electric action of the driver so as to capture and deflect the light beams output from the input optical element using the electric action; and
an output optical element which emits the light beams deflected by the optical deflector to an image plane,
wherein the optical scanner is configured to scan the image plane with the light beams by adjusting the voltage signal of the driver.

2. The optical scanner according to claim 1, further comprising an optical adjuster which adjusts optical paths of the light beams emitted from the output optical element.

3. The optical scanner according to claim 1, further comprising an optical shield which blocks one of two beam spots of the light beams which are most deflected by application of a maximum voltage by the driver.

4. The optical scanner according to claim 1, wherein the optical splitter is a transmissive-type optical switch configured to transmit or block the light from the light source.

5. The optical scanner according to claim 1, wherein the optical splitter is a reflective-type optical switch configured to reflect or stop reflecting the light from the light source.

6. The optical scanner according to claim 1, wherein the optical splitter is an optical switch embedded in the optical deflector configured to guide or stop guiding the light from the light source to the deflector portions.

7. The optical scanner according to claim 1, wherein the driver is configured to apply voltages at different frequencies to the respective deflector portions.

8. The optical scanner according to claim 1, further comprising a plurality of optical adjusters configured to adjust optical paths of the light beams emitted from the output optical element, the plurality of optical adjusters being arranged in association with the deflector portions, respectively, so as to compensate for the optical paths of the light beams deflected by the deflector portions separately.

9. The optical scanner according to claim 1, further comprising a plurality of mirrors configured to adjust optical paths of the light beams emitted from the output optical element, the plurality of mirrors being arranged in association with the deflector portions, respectively, so as to compensate for the optical paths of the light beams deflected by the deflector portions separately.

10. An optical scanner comprising:
a light source;
an optical splitter which splits light from the light source into a plurality of light beams;
an input optical element on which the light beams split by the optical splitter are incident;
a driver which generates a voltage signal;
an optical deflector including at least two deflector portions formed adjacent to each other on a substrate, the two deflector portions being individually supplied with an electric action of the driver so as to capture and deflect the light beams output from the input optical element using the electric action;

an output optical element which emits the light beams deflected by the optical deflector to an image plane; and an optical adjuster which adjusts optical paths of light beams emitted from the deflector portions to travel to the image plane without crossing over each other, wherein the optical scanner scans the image plane with the light beams by adjusting the voltage signal of the driver.

11. The optical scanner according to claim 3, further comprising a plurality of mirrors configured to adjust optical paths of the light beams emitted from the output optical element, the plurality of mirrors being arranged with the deflector portions, respectively, so as to compensate for the light beams blocked by the optical shield.

* * * * *